United States Patent [19]

Bukala

[11] Patent Number: 4,560,227
[45] Date of Patent: Dec. 24, 1985

[54] FUSEHOLDER FOR BLADE-TYPE FUSES

[75] Inventor: Alexander E. Bukala, Chicago, Ill.

[73] Assignee: Littelfuse, Inc., Des Plaines, Ill.

[21] Appl. No.: 464,046

[22] Filed: Feb. 4, 1983

[51] Int. Cl.$^4$ .......................................... H01R 13/514
[52] U.S. Cl. ................................ 339/147 R; 339/128; 339/198 H
[58] Field of Search ............ 339/125 R, 126 R, 128 R, 339/198 H, 91 R, 147 R

[56] References Cited

U.S. PATENT DOCUMENTS

| 3,213,189 | 10/1965 | Mitchell et al. | 339/128 X |
| 3,523,269 | 8/1970 | Witer et al. | 339/128 X |
| 3,645,353 | 2/1972 | Cope et al. | 339/128 X |
| 3,753,212 | 8/1973 | Yamada et al. | 339/91 R |
| 3,989,343 | 11/1976 | Lucius et al. | 339/128 |
| 4,046,452 | 9/1977 | Cassarly | 339/198 H |
| 4,425,018 | 1/1984 | Stenz | 339/198 GA X |
| 4,466,683 | 8/1984 | Ballarini | 339/125 R X |

Primary Examiner—Eugene F. Desmond
Attorney, Agent, or Firm—Russell E. Hattis

[57] ABSTRACT

A panel-mounted fuseholder unit for accepting fuses is provided with integral snap-in mounting means for securely engaging the panel in regions peripheral to a panel mounting aperture when mounted preferably from the rear of the panel so that the fuseholder can be pre-attached to a wire harness. Complementary preferably latched side-engaging means allow an interlocked side-by-side array of fuseholder units to be fabricated and panel mounted by their individual mounting means. The side engaging means are disposed sufficiently away from the engaged panel so that no special contouring of the aperture is necessary to provide clearance.

19 Claims, 11 Drawing Figures

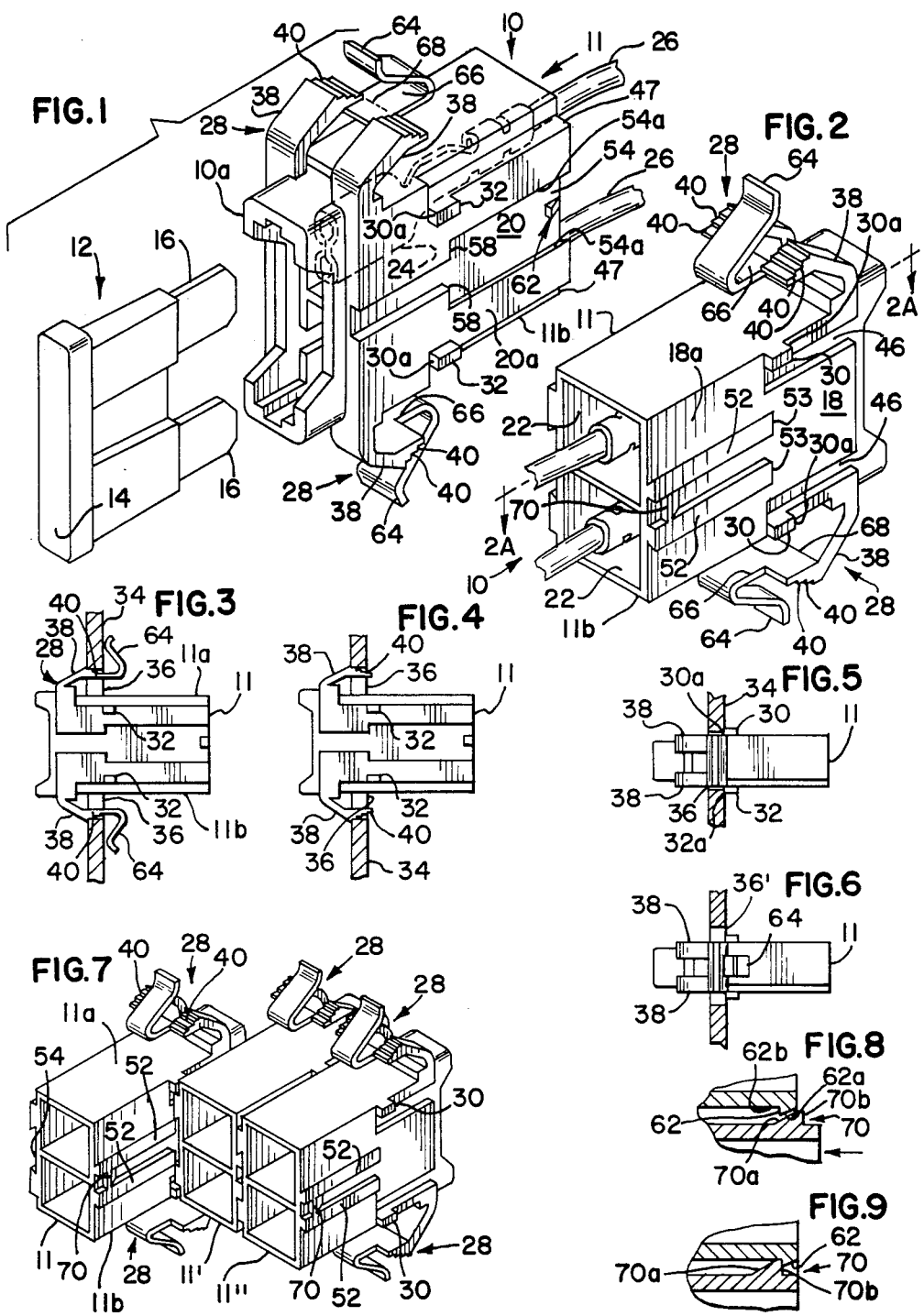

4,560,227

FUSEHOLDER FOR BLADE-TYPE FUSES

TECHNICAL FIELD OF THE INVENTION

The technical field of the invention is electrical fuses, in particular fuseholders and mounting systems therefor.

BACKGROUND OF INVENTION

It has heretofore been customary to design panel mounted fuseholders for snap-in insertion into a panel aperture from the front thereof. Such panel mounted fuseholders were not made for pre-assembly to other similar fuseholders so that if the panel were to receive a desired number of fuseholders, the panel would have individual mounting apertures for each fuseholder or one large aperture would be provided for a fixed length multi-station fuseholder generally inserted from the front of the panel.

It is much more desirable to have fuseholders insertable into the panel from the rear thereof, so that they may be wired to a pre-existing electrical harness, and then simply inserted into the panel opening and mounted thereto, without necessitating further lead attachment thereby simplifying assembly. While there have been fuseholders designed for insertion into the panel from the rear thereof, no such fuseholders are known to have been developed prior to the invention with integral snap-in clips permitting such rear end insertion which must be designed differently from the clips used for front panel mounting thereof. There probably have been provided for rear panel mounting fuseholder designs requiring separate additional parts to secure the fuseholder to the panel, such parts taking the form of a separate mounting bezel, a mounting nut, or parts performing a similar retention function. These additional components add to the complexity and cost of the assembly.

One aspect of the present invention uniquely utilizes selectively for harness suspension mounting or panel mounting some of the features of a fuseholder array construction heretofore used in fuse assemblies designed only for suspension on a cable assembly. In this prior art construction, an array of individual fuseholder units was provided where each unit was configured for selective side by side interlocking attachment to an identical fuseholder unit on either side thereof so that the fuseholder array could have any desired number of fuseholders in the array.

These prior art variable-sized fuseholder arrays were not provided with means for snap-in mounting thereof in panel apertures. Even if such arrays would be provided with snap-in clips for front panel mounting thereof, such a design would provide undesired problems because the means which interlocked adjacent fuseholder units would probably require specially configured cutouts in the mounting aperture to clear the sideward projecting interlocking engaging elements involved, to allow the passage of the fuseholders at least partially through the panel. Also, if such a fuseholder array were, as is more customary, fabricated for front panel mounting, the wiring harness could not be conveniently pre-attached to the fuseholder terminals before securing the array to the panel.

Finally, the prior art fuseholder arrays did not adequately cope with the problem of an oversized panel mounting aperture. In other words, the individual or fixed length multi-station panel mounted fuseholder required a mounting aperture of fairly precise length because of the design of the mounting means therefor. Frequently, one desires to mount one or more fuseholder units in a panel aperture not precisely sized to fit the fuseholder involved.

Thus, prior to the present invention, there was a need for a fuseholder unit configured either for individual or collective mounting, and wherein the one or more fuseholder units involved may be prewired and inserted from the rear of a mounting panel aperture, preferably by individual snap-in panel mounting means integral to each fuseholder unit and requiring no additional retention parts disposed on the front or rear surface of the panel. Such fuseholders, again either as individual or assembled units, most desirably should be mountable in a simple rectangular aperture requiring no special side clearance cutouts in the mounting aperture, and which can be an oversized mounting aperture. Also, it is desirable that the panel mounting means for the fuseholder unit or array should be sufficiently strong to securely retain the fuse array in the panel, and the means for interlocking adjacent fuseholder units should provide a positive latching lock to prevent them from sliding apart under vibration, or during the insertion or withdrawal of fuses from the panel. Moreover, the fuseholder units most desirably should be so lightweight that they may be alternatively configured to be suspended either individually or as a grouped array directly from the wiring harness.

SUMMARY OF THE INVENTION

According to a feature of the invention, a panel mountable fuseholder unit is configured with snap-in mounting means whereby the fuseholder unit (or an array of the same) may be mounted through a mounting panel aperture by simple snap-in engagement from the rear of the panel. Such mounting means most advantageously include resilient clip means which fit into said aperture from the rear of the panel and spring out to make engagement with the front face of the panel, and insertion limiting means for engaging the rear face of the panel to limit the insertion distance of the unit at least when said clip means make such spring-out engagement with said panel. The resilient clip means preferably project from opposite longitudinal margins of the fuseholder unit (i.e. the margins transverse to the lateral side margins thereof).

The insertion limiting means preferably are rigid bosses which abut the rear face of the panel. These bosses preferably project laterally from the lateral sides of the fuseholder unit. The panel mounting means also may preferably include resilient backing means which engage the rear face of the panel to be stressed before the clip means spring out, so that stress on these backing means force the clip means rearwardly against the mounting panel. Also, these resilient backing means permit the fuseholder unit to be held in the panel aperture where an oversized aperture prevents the rigid bosses from engaging the rear of the panel.

According to another feature of the invention, each fuseholder unit is configured with complementary latchable interlocking or engaging means on either side thereof whereby a plurality of such fuseholders may be securely locked together in side by side locking arrangement to form a linear array for panel mounting, preferably from the rear of the panel. The complementary latchable interlocking means of the individual fuseholder units preferably have tongue-and-groove contours and latching means cooperating therewith, and which means are disposed sufficiently rearward on each fuseholder unit body that no special accommodation need be made in the panel mounting aperture to provide for their clearance.

Thus, such a modular fuseholder unit and array formed thereby provide not only simplified panel mounting capability without necessitating extra parts, but can be formed into securely locked together modular arrays of arbitrary length configurable either for cable harness mounting or for snap-in engagement with a simple rectangular hole in the mounting panel without requiring special precision made at mounting apertures.

Other objects, advantages, and features of the invention will become apparent upon making reference to the description to follow, the drawings, and the claims.

DESCRIPTION OF DRAWINGS

FIG. 1 is a front perspective view of a fuseholder unit of the invention for accepting a blade-type fuse from the front thereof and including conductor attached terminal blade-receiving clips extending therefrom;

FIG. 2 is a rear perspective view of the same fuseholder unit;

FIG. 3 is a partial cross section view of the fuseholder unit inserted through a panel aperture and captively secured thereto by means of integral mounting clips;

FIG. 4 is a similar view showing one aspect of a similar panel mounting arrangement to that shown in FIG. 3 wherein the mounting clips are reconfigured with rear portions thereof removed;

FIG. 5 is a partial cross section view of the panel mounting arrangement shown in FIG. 4, further showing rear panel engagement thereof by side bosses on the fuseholder;

FIG. 6 is a partial cross section view of the panel mounting arrangement of FIG. 3, showing the fuse of the rear panel engaging elements on the clips to allow proper panel mounting in spite of an oversized panel aperture;

FIG. 7 is a perspective view of a group of three fuseholder units of the type shown in FIG. 1, showing latchable side interlocking means whereby an array of mutually interlocking and self-supporting fuseholder units is formed;

FIGS. 8 and 9 are fragmentary cross-section views showing intermediate and final stages of assembly of a fuseholder unit to the array as shown in FIG. 8, and in sequential steps the actuation and locking of a latching means integral to the fuseholders.

DETAILED DESCRIPTION OF THE INVENTION

Figure 2A:
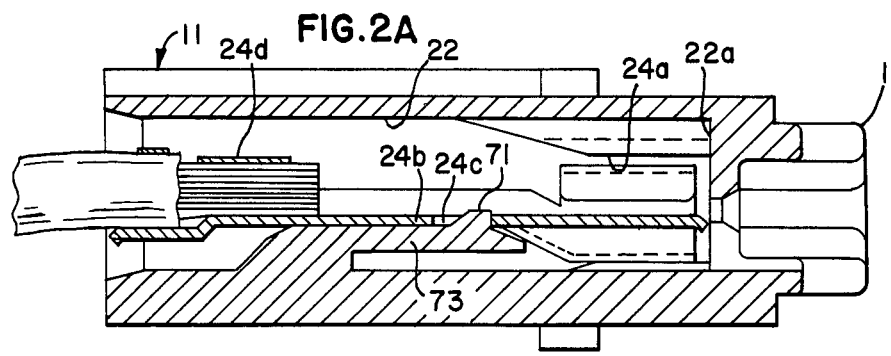
FIG. 2A is a fragmentary longitudinal section through the fuseholder unit FIG. 2, taken along section line 2A—2A in FIG. 2, showing how the fuse terminal-receiving connections are secured therein.

As previously indicated, the subject matter of the invention is a fuseholder unit for blade-type fuses having parallel confronting terminals typically configured as blades, the fuseholder unit having two most important distinguishing features over the prior art. The first is a feature whereby the fuseholder unit may be preassembled with lead wires to the internal connector elements carried in the fuseholder unit, the entire assembly then being securable in a preferably rectangular aperture in a chosen mounting panel by mounting means providing simple snap-in pressing engagement from the rear of the panel. The second most important feature of the invention resides in the configuration of the individual fuseholder units so as to be nested in side by side secure interlocked arrangement, whereby an array of such fuseholder units can be fabricated at will to accommodate an arbitrary number of fuses, the snap-in mounting elements of each fuseholder unit engaging with the longitudinal margins of the panel mounting aperture (by "longitudinal" meaning the direction transverse to the direction in which the fuseholder units can be interlocked to form an array of such units).

FIG. 1 shows a representative fuse 12 having blade-type terminals 16 extending in parallel confronting relation from a fuse body 14. A fuseholder unit 10 of the invention is shown in various views, both singly and assembled in array form. There is shown on the fuseholder unit 10 snap-in mounting means 28 and 64 to be described which, usually in association with insertion limiting bosses 30 and 32, secure each fuseholder unit in an aperture 36 of a mounting panel 34 shown in FIGS. 3-6. The fuseholder unit 10 preferably has a molded synthetic plastic body 11 having a body with a generally vertically elongated rectangular configuration, as viewed in the drawings. The front end 10a is shown open to receive the terminal blades 16 of a blade type automobile fuse like that disclosed in U.S. Pat. No. 3,909,767. The fuseholder body 11 preferably has flat parallel top and bottom surfaces 11a and 11b and flat, parallel side faces 18a and 20a preferably having various recesses and projecting parts to be described. The body 11 has a pair of vertically spaced front-to-rear connector passages 22-22 (FIGS. 2 and 2A) in which are located cable attached terminal blade-receiving clips 24 snap-locked in the passages 22-22 in the manner shown in FIG. 2A.

Projecting rearwardly from the top and bottom (or longitudinal margins) of the body 11 near the front end thereof are a pair of laterally spaced, outwardly and rearwardly projecting resilient cantilever clips 28 having rearwardly facing stepped outer end portions 40 joined to the main portion of the fuseholder body through smoothly contained joining portions 38. When the fuseholder unit 10 is inserted from the rear of a panel 34 (see for example FIG. 3) having a rectangular aperture 36 disposed therein, the engagement of the aperture walls with the smoothly contoured clip bridging portions 38 cams the clips 28 inwardly, until the fuseholder body 11 is inserted sufficiently through the panel 34 that the clips 28 resiliently spring outward to engage the front of the panel 34 by means of the steps in the stepped end portion 40 thereof. The limit of the insertion of the fuseholder unit into the panel aperture 36 is best carried out by use of a pair of laterally projecting bosses 30-32 disposed on each lateral side of the housing 11. These bosess have flat forwardly facing shoulders 30a-32a which engage the rear side of the panel 34 when the stepped portions 40 of the clips 28 are in position to engage with the front side of the panel 34. Resilient backing fingers 64 are provided, each of which extends forwardly from a rearwardly projecting web 66 bridging the inner faces of the stepped end portions 40 of one of the pair of clips 28 at the top and bottom of the fuseholder unit 10. The ends of the fingers 64 engage the rear side of the panel 34 before the bosses 30-32, and thus are stressed as the forward movement of the fuseholder unit is continued until the bosses 30–32 engage the rear side of the panel, where the clip ends spring outwardly. The stress on the fingers 64 create a rearward force which holds the clips against the front side of the panel.

There are circumstances when the backing fingers 64 are best removed, as shown in FIG. 4, when there is insufficient panel area to accommodate them. The fingers 64 are then broken away along the break lines 68 (FIGS. 1 and 2). The backing fingers 64 are particularly useful in retaining the fuseholder in place when the panel aperture 36 is cut overly wide, as shown by aperture 36 in FIG. 6, preventing panel engagement by the side bosses 30–32.

The design of the fuseholder unit of the invention, because it is mounted from the rear of the panel 34, may be conveniently pre-cabled to the wiring harness before installation.

To allow for the easy assembly of the fuseholder units into an array of such units, the opposite lateral sides 18 and 20 (FIGS. 1 and 2) of each fuseholder body are configured with complementary tongue and groove sliding interlocking means whereby a plurality of such fuseholder units may be joined together along the lateral sides thereof, to provide a rigidly locked array of fuseholder units. Such an array of fuseholder units are then mountable in an elongated rectangular panel aperture, if desired, by the various clips 28 and backing fingers 64 of all of the fuseholder units, in the same manner as described above for mounting a single fuseholder unit in a smaller panel aperture 36 or 36'.

Figure 7A:
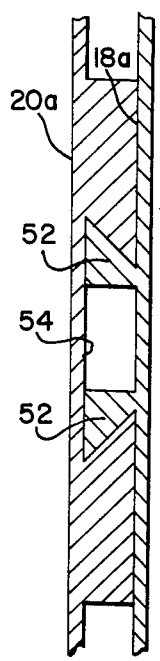
FIG. 7A is a fragmentary vertical sectional view through the complementary interlocking means of a pair of adjacent fuseholder units of FIG. 8.

The interlocking means referred to are most desirably dovetail-shaped tongue and groove means best shown in FIGS. 1 and 2. Thus, the corresponding side 18 of each fuseholder body 11 has a pair of spaced front to back extending tongue rails 52 extending laterally outwardly and forwardly from the rear margin of the fuseholder body only partway the length of the body. The opposite side 20 thereof has a single correspondingly positioned and configured dovetail-shaped channel 54 extending from the rear of the housing body and terminating at an arresting edge 58. The outer margins 54a—54a of the channel 54 have inclined edges which mate with the corresponding outer edges of the rails 52, as best shown in FIG. 8A. Thus, when the side 18 of a fuseholder body 11 is interlocked with a side 20 of another fuseholder body 11' (FIG. 7) by a simple sliding insertion of the tongue rails 52 on the side 18 of one body into the channel 54 on the side 20 of the other body, the insertion travel being limited to dispose the array 11-11'-11" in a linear fashion by the engagement of the forward ends 53 of the tongue rails 52 into contact with the arresting edge 58 disposed at the inner end of the channel 54.

It will be noted that the bosses 30—30 (FIG. 2) on the lateral side of each fuseholder body 11 are disposed closer to the upper and lower surfaces of the fuseholder body 11 than are their counterparts 32—32 on the opposite side 20 thereof. Thus, clearance grooves 46—46 are provided in the fuseholder body side 18 to allow the side bosses 32—32 to slide along the adjacent structure without opposition. Similarly, clearance recesses 47—47 are provided in the fuseholder body side 20 to allow the opposing side bosses 30—30 to similarly move into place.

Positive locking retention of adjacent fuseholder units when fully interlocked is provided by latching means obtained by configuring each fuseholder body side 18 with an outwardly extending locking rail 70 disposed between the tongue rails 52, and configuring each fuseholder body side 20 with a corresponding locking ramp 62. The ramp 62 has a rear inclined face 62a terminating in a forwardly facing shoulder 62b, and the rail 70 has a front inclined face 70a terminating in a rearwardly facing shoulder 70b. When the adjacent fuseholder bodies are moved into their final positions as shown in FIGS. 8 and 9, the inclined rail face 70a slides over the ramp face 62a to deform the ramp so that the rail shoulder 70b confronts the ramp shoulder 62b, to latch the fuseholder bodies involved together, which secures the same against accidental disassembly, as when stressed during fuse insertion.

An array of fuseholder units may be mounted in an elongated rectangular panel aperture with or without the aid of the backing fingers 64, which can be accordingly removed or left in place as previously described, if the ends of the aperture terminate short of the projecting bosses 30 and 32, as shown in FIG. 5 for a single fuseholder unit. However, if the array is substantially shorter than the long dimension of the aperture, so that the side bosses 30 and 32 will not be able to provide a rear support for the array, then the fingers 64 must be retained for this purpose. The ability to mount an array of fuseholder units in an overlength panel aperture is desirable, particularly in installations where it may be desirable to reduce the number of fuseholder units in a given array, while still retaining the original aperture, rather than retool to reconfigure a new panel.

It will be noted in FIGS. 1 and 2 that the tongue and groove interlocking means on sides 18 and 20 of each fuseholder body 11 are disposed rearwardly of the side bosses 30 and 32 which engage the rear side of the mounting panel 34. Thus, all laterally outwardly projecting parts of the fuseholder bodies disposed of the sides 18 and 20 are situated to the rear of the mounting panel where the size of the panel mounting aperture does not have to accommodate these parts, since the fuseholder units are mounted on the panel from the rear thereof. Thus, the aspect of the invention which permits the flush mounting of fuseholder units singly or in an array within a simple rectangular aperture without the need for special clearance cut-outs in such aperture would not be possible for a fuseholder design where it must be inserted from the front of the panel. Also, although clipped-together fuseholder arrays are well known in the art, their side interlocking means are invariably disposed sufficiently forward thereof that a simple rectangular panel mounting aperture is inadequate, and a special configuration of the mounting aperture is necessary to provide clearance for these elements.

FIG. 2A shows the manner in which the cable attached terminal blade-receiving clips 24 are snap-locked into each of the passages 22. As there shown, the clip 24 which is a conventionally designed clip, has a fuse terminal receiving socket portion 24a at the front thereof which joins a shank portion 24b having an aperture 24c adapted to receive the projecting portion 71 of a forwardly extending resilient finger 73 extending from the fuseholder body 11 within the connector passage 22. This projecting portion 71 passes into the clip aperture 24c when the front of the clip engages the front defining wall 22a of the passage 22. The shank portion 24b of the clip 24 joins a cable terminating-receiving socket 24d which is crimped around a bared end of a cable.

It will be appreciated that, although the present disclosure describes a fuseholder for blade-type fuses 12 having parallel confronting blade terminals 16 (FIG. 1), the foregoing principles for a rear panel mounted snap-in fuseholder body may readily be extended to other types of fuses and fuse mounting systems. Thus, for example, the fuse need not be of the blade type at all, but may be conventional cylindrical end caps in which case the terminal-receiving clips 24 in FIGS. 1 and 2A may instead be configured to extend forward to insertingly accept such a fuse. Also, while many of the features of the invention are best utilized in or are limited to rear panel mounted fuseholder units, some features of the invention could be adapted for front panel mounted fuseholder assemblies. Thus, while the invention has been particularly shown and described with reference to a preferred embodiment thereof, it will be understood by those skilled in the art that various changes in form and details may be made therein without departing from the spirit and scope of the invention.

I claim:

1. A fuseholder unit adapted to be joined to other identical units at either lateral side thereof to form an elongated array of such units to be mounted in an elongated aperture in a mounting panel, each unit to house a fuse having spaced terminals, said fuseholder unit comprising an electrically insulating body forming a housing for insertion of a fuse from the front of said mounting panel, said body having passage means containing a pair of fuse terminal engaging contacts and communicating with a fuse insertion opening in the forward face of said housing to allow insertion of said fuse where said contacts engage with said terminals of the fuse, complementary fuseholder interconnecting means on the opposite lateral sides thereof for joining other identical fuseholder units thereto to form said array of units so that a closely fitting array of units of any desired length can be formed, mounting means for mounting said fuseholder body in said elongated panel aperture, said mounting means including resilient clip means integral with and projecting therefrom and which when compressed fit into said mounting panel aperture and spring out to make engagement with the opposite side of the panel when passed through said aperture, and said resilient clip means extending to the lateral side margins of the fuseholder unit body so that the clip means of adjacent units are in confronting contiguous relation.

2. The fuseholder unit of claim 1 wherein said clip means project rearwardly from the opposite margins of the fuseholder body which are transverse to said opposite lateral sides thereof and permit the fuseholder units to be mounted in said panel from the rear thereof.

3. The fuseholder unit of claim 2 wherein there projects from the opposite margins of the fuseholder body which are transverse to said opposite lateral sides thereof resilient backing means which engage the rear surface of the panel to be stressed before the clip means spring out, so that the stress on these backing means force the clip means rearwardly against the mounting panel.

4. The fuseholder unit of claim 1 wherein one of said complementary fuseholder interconnecting means includes tongue means and the other of same includes groove means of complementary configuration, so that the first lateral side of a fuseholder unit and the adjacent side of an identical second fuseholder unit may be slidably engaged together by tongue and groove engagement therebetween.

5. The fuseholder unit of claim 4 wherein the fuseholder body has a first latching means on one lateral side thereof and a complementary latching means on the opposite lateral side thereof so that the complementary latching means of adjacent fuseholder units are latched together when one unit is fully slid into position on the other of same, said first and complementary latching means comprising oppositely facing inclined portions terminating in oppositely facing shoulder so that when said one lateral side of an identical second fuseholder unit is slidingly engaged together said inclined surfaces of the complementary latching means thereof slide over one another, wherein the complementary latching means thereof snap into locking relation when the opposing shoulders thereof are in confronting relation.

6. The fuseholder of claim 1 wherein said clip means comprise at least one outwardly inclining and rearwardly facing cantilever clip having a stepped outer end for engaging the edges of the panel aperture.

7. The fuseholder unit of claim 1 wherein said fuseholder body has insertion limiting means projecting from said body rearwardly of said panel mounting means for engaging the panel to limit the insertion distance of the fuseholder unit at least when said clip means make such spring-out engagement with said panel, and said clip means and insertion limiting means comprise a pair of the same on the opposite margins of the fuseholder body.

8. The fuseholder unit of claim 7 wherein said clip means and insertion limiting means respectively extend from different sides of said body.

9. The fuseholder unit of claim 1 combined with a number of identical fuseholder units connected in side by side relationship through said fuseholder interconnecting means to form said elongated array of such units, and a mounting panel having an elongated aperture into which said array of units is mounted with said mounting means engaging the opposite longitudinal margins of the aperture, and said fuseholder units having fuses inserted into said fuse insertion openings thereof, said fuses having terminals making electrical contact with said fuse terminal engaging contacts.

10. The fuseholder unit of claim 1 wherein said complementary interconnecting means comprises a pair of spaced dove-tail projecting means on one lateral side of said body and a complementary groove-forming means on the opposite lateral side thereof adapted slidably to receive and interlock with the dove-tail projecting means of an adjacent unit, said fuseholder body having a first fuse latching means on one lateral side thereof between said pair of dove-tail projections and a complementary latching means on the opposite lateral side thereof so that the complementary latching means of adjacent fuseholder units are latched together when one unit is fully slid into position on the other of same, said first and complementary latching means comprising oppositely facing inclined portions terminating in oppositely facing shoulders, so that when said one lateral side of a first said fuseholder unit and said opposite lateral side of an identical second fuseholder unit are slidingly engaged together said inclined surface of the complementary latching means thereof slide over one another, wherein the complementary latching means thereof snap into locking relation when the opposing shoulders thereof are in confronting relation and mounting means for mounting said fuseholder body in said elongated panel aperture.

11. The fuseholder unit of claim 10 combined with a number of identical fuseholder units connected in side by side relationship through said fuseholder interconnecting means to form said elongated array of such units, and a mounting panel having an elongated aperture into which said array of units is mounted with said mounting means engaging the opposite longitudinal margins of the aperture, and said fuseholder units having fuses inserted into said fuse insertion openings thereof, each said fuse having terminals making electrical contact with said fuse terminal engaging contacts.

12. The fuseholder unit of claim 10 wherein said fuseholder unit has aperture means at the rear thereof to which is snap-fitted terminals for connection to an external cable.

13. The fuseholder unit of claim 1 combined with a fuse inserted into said fuse insertion opening of said housing, said fuse having terminals making electrical contact with said fuse terminal engaging contacts.

14. The fuseholder of claim 1 wherein said fuseholder unit has aperture means at the rear thereof into which is snap-fitted terminals for connection to an external cable.

15. A fuseholder unit adapted to be joined to other identical units at either lateral side thereof to form an elongated array of such units to be mounted in an elongated aperture in a mounting panel, each unit to house a fuse having spaced terminals, said fuseholder unit comprising: an electrically insulating body forming a housing for insertion of a fuse from the front of said mounting panel, said body having passage means containing a pair of fuse terminal engaging contacts and communicating with a fuse insertion opening in the forward face of said housing to allow insertion of said fuse where said contacts engage with said terminals of the fuse, complementary fuseholder interconnecting means on the opposite lateral sides thereof for joining other identical fuse holder units thereto to form said array of units so that a closely fitting array of units of any desired length can be formed, and mounting means for mounting said fuseholder body in said elongated panel aperture, said mounting means including resilient clip means projecting from at least one margin of said body transverse to said lateral sides thereof and which when compressed fit into said mounting aperture from one side of the panel and spring out to make engagement with the opposite side of the panel when passed through said aperture; and insertion limiting means for engaging said one side of the panel to limit the insertion distance of the fuseholder unit at least when said clip means make such spring-out engagement with said panel, said insertion limiting means being rigid projecting means projecting from one lateral side of said fuseholder unit body, and complementary recess means on the opposite lateral side of the body for receiving therein the projecting means of the insertion limiting means of the adjacent fuseholder unit so that the adjacent unit can be closely nestled together.

16. The fuseholder unit of claim 15 wherein said resilient clip means extend to the lateral side margins of the fuseholder unit body so that the clip means of adjacent units are in confronting contiguous relation.

17. The fuseholder unit of claim 15 combined with a fuse inserted into said fuse insertion opening of said housing, said fuse having terminals making electrical contact with said fuse terminal engaging contacts.

18. The fuseholder unit of claim 15 combined with a number of identical fuseholder units connected in side by side relationship through said fuseholder interconnecting means to form said elongated array of such units, and a mounting panel having an elongated aperture into which said array of units is mounted with said mounting means engaging the opposite longitudinal margins of the aperture, and said fuseholder units having fuses inserted into said fuse insertion openings thereof, each said fuse having terminals making electrical contact with said fuse terminal engaging contacts.

19. The fuseholder unit of claim 15 wherein said fuseholder unit has aperture means at the rear thereof to which is snap-fitted terminals for connection to an external cable.

* * * * *